US012761506B1

(12) United States Patent
Hung et al.

(10) Patent No.: US 12,761,506 B1
(45) Date of Patent: Oct. 13, 2026

(54) VISIBLE LIGHT MODULATOR FOR HIGH-SPEED OPTICAL COMMUNICATION AND OPTICAL COMPUTING

(71) Applicant: OPTILAB, LLC, Phoenix, AZ (US)

(72) Inventors: Henry H. Hung, Paradise Valley, AZ (US); Ke Huang, Phoenix, AZ (US); Leijun Yin, Tempe, AZ (US); Xiaoyan Ying, Tempe, AZ (US)

(73) Assignee: OPTILAB, LLC, Phoenix, AZ (US)

( * ) Notice: Subject to any disclaimer, the term of this patent is extended or adjusted under 35 U.S.C. 154(b) by 0 days.

(21) Appl. No.: 19/212,185

(22) Filed: May 19, 2025

(51) Int. Cl.
*G02F 1/035* (2006.01)

(52) U.S. Cl.
CPC ........ *G02F 1/035* (2013.01); *G02F 2201/066* (2013.01)

(58) Field of Classification Search
CPC ........................... G02F 1/035; G02F 2201/066
USPC ......................................... 359/237, 245, 254
See application file for complete search history.

(56) References Cited

U.S. PATENT DOCUMENTS 10,788,689 B1 * 9/2020 Lentine ................. G02F 1/0356
2020/0363693 A1 * 11/2020 Zou ......................... G02F 1/015

OTHER PUBLICATIONS

International Application No. PCT/US2026/025911, International Search Report and Written Opinion mailed on Jun. 17, 2026, 9 pages.

* cited by examiner

*Primary Examiner* — William Choi
(74) *Attorney, Agent, or Firm* — Kilpatrick Townsend & Stockton LLP

(57) ABSTRACT

A visible light modulator designed for high-speed optical communication and computing is introduced. This disclosure features a modulator substrate for structural support and integration of optoelectronic components, along with a thin-film optical waveguide layer equipped with coplanar waveguide electrodes to modulate optical signals via an electric field. The visible light modulator includes input and output optical waveguides for signal transmission, an optical distribution device to enable parallel processing across multiple modulation channels, and optoelectronic detectors for real-time performance monitoring. Radio frequency (RF) electrodes control the electro-optic response of the thin-film material, while bias electrodes adjust the refractive index, optical path differences, and interferometer balance for precise phase modulation and optimized output. This modulator enhances optical signal modulation efficiency and response speed, expands bandwidth, minimizes conversion losses, and significantly improves transmission efficiency and system reliability.

17 Claims, 8 Drawing Sheets

VISIBLE LIGHT MODULATOR FOR HIGH-SPEED OPTICAL COMMUNICATION AND OPTICAL COMPUTING

BACKGROUND

Field

The present disclosure pertains to the field of optical systems, with particular focus on a visible light modulator designed for high-speed optical communication and optical computing applications.

Background

In the fields of modern optical communication and optical computing, the research and development of high-speed visible light modulators is of critical importance. These modulators typically utilize nonlinear materials such as lithium niobate (LiNbO3), potassium dihydrogen phosphate (KDP), potassium titanyl phosphate (KTP), or barium titanate (BaTiO3) to achieve efficient and high-speed optical signal modulation. High-speed visible light modulators based on the electro-optic effect of these materials demonstrate excellent modulation capabilities in the visible light spectrum, effectively meeting the growing demands for data transmission and processing.

High-speed optical modulation technology not only significantly enhances the bandwidth and efficiency of data transmission but also drives the development of optical communication systems, especially in fields such as fiber optic networks, optical computing, and high-speed internet infrastructure. Moreover, high-speed optical modulation technology may play a key role in advanced applications such as quantum computing and medical imaging. However, the performance of these devices in the visible light spectrum still faces certain limitations.

Specifically, traditional silicon-based photonic devices suffer from significant losses in the visible light spectrum. Although modulators based on III-V materials have shown improved performance, they come with higher manufacturing costs and poor compatibility with existing silicon-based technologies. Therefore, the development and optimization of high-speed optical modulators for the visible light spectrum is crucial for advancing and enhancing communication technologies.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The present disclosure addresses the issues associated with traditional silicon-based modulators, which suffer from high loss, as well as modulators based on III-V materials, which, while offering improved performance, are costly and incompatible with existing silicon-based technologies. The disclosure proposes a visible light high-speed modulator based on thin-film electro-optic materials. Through innovative device structure and manufacturing processes, the performance and integration of the modulator are significantly enhanced. This modulator not only offers high modulation bandwidth and low insertion loss, but also ensures compatibility with existing silicon photonics technology, providing crucial technological support for future efficient visible light communication systems.

The technical solution employed to solve the technical problems of the disclosure is as follows: A visible light modulator for high-speed optical communication and optical computing, comprising: a modulator substrate, providing structural support and serving as an integration platform for optoelectronic components; a thin-film optical waveguide layer arranged on the modulator substrate, equipped with coplanar waveguide electrodes to modulate optical signals via an applied electric field; an input optical waveguide for transmitting input optical signals; an output optical waveguide for guiding modulated optical signals; an optical distribution device for splitting the optical signals entering the input optical waveguide into multiple modulation channels to enable parallel processing; a plurality of optoelectronic detectors arranged at the output of each modulation channel to monitor modulated optical signals and perform real-time performance evaluation; radio frequency (RF) electrodes for applying a modulation voltage to control the electro-optic response of the material; and bias electrodes for adjusting the refractive index in the interferometer arms, fine-tuning optical path differences, and regulating phase modulation and output signal intensity, balancing the interferometer, and setting the bias point to ensure optimal operation.

According to one aspect, a visible light modulator, comprising: a modulator substrate; a thin-film optical waveguide structure disposed over the modulator substrate, wherein the thin-film optical waveguide structure comprises an electro-optic material and a set of coplanar radio frequency (RF) electrodes electro-optically coupled to a set of thin-film optical waveguides to modulate a set of optical signals using RF signals, thereby generating a set of modulated optical signals, respectively; a buried waveguide layer disposed below the thin-film optical waveguide structure, wherein the buried waveguide comprises a material selected from the group consisting of silicon nitride, silicon, silicon dioxide, or optical polymers; at least one optical coupler configured to transfer light from the buried waveguide to the thin-film electro-optic waveguide structure; and a set of output optical waveguides configured to receive the modulated optical signals.

According to another aspect, the optical distribution device is an optical splitter, an arrayed waveguide grating (AWG) demultiplexer, a Y-branch splitter, or a multimode interference (MMI) splitter. The AWG demultiplexer is suitable for wavelength division multiplexing (WDM) applications. According to another aspect, the coplanar waveguide electrodes include signal electrodes and ground electrodes. According to another aspect, the electrode structure of the visible light modulator uses a periodically loaded coplanar slot-waveguide electrode structure. The coplanar slot-waveguide electrodes optimize RF parameters by adjusting the slot dimensions to ensure high modulation efficiency and impedance matching. According to another aspect, the input and output optical waveguides use dual-stage inverse-tapered tip couplers for mode conversion. According to another aspect, the tip width of the inverse-tapered coupler is between 100 nanometers (nm) and 700 nm, used for mode conversion between fiber optics and thin-film optical waveguides.

According to another aspect, the thin-film optical waveguide layer includes an electro-optic material thin film for performing optical signal modulation, with its electro-optic response characteristics controlled by the modulation voltage applied by the RF electrodes. According to another aspect, the electro-optic material thin film is one of lithium niobate ($LiNbO_3$), potassium dihydrogen phosphate (KDP), potassium titanyl phosphate (KTP), electro-optic polymers, or barium titanate ($BaTiO_3$). According to another aspect, the material of the optical waveguide in the thin-film optical waveguide layer is silicon nitride, silicon, or polymer. According to another aspect, the visible light modulator further includes a covering layer, covering the thin-film electro-optic material layer and the coplanar waveguide electrodes. The material of the covering layer is silicon dioxide ($SiO_2$) or polymer.

In the visible light spectrum, the selection of photonic devices may be important to the overall system's performance. Traditional silicon-based photonic devices face significant challenges in this spectrum, particularly in terms of optical loss. Due to high absorption and scattering losses of silicon in the visible light range, the efficiency of these devices is significantly reduced in practical applications. Additionally, the bandgap of silicon limits its application at shorter wavelengths, further restricting its use in the visible light spectrum.

To address these issues, researchers have turned to III-V compound semiconductors, such as gallium arsenide (GaAs) and indium phosphide (InP). These materials offer superior optical properties in the visible light spectrum, including lower absorption losses and better refractive index control. Modulators made from III-V materials show significant improvements in key performance metrics such as modulation speed, modulation depth, and optical loss.

However, despite the excellent performance of III-V materials, their application still faces major challenges. First, the manufacturing costs of III-V materials are relatively high. Their growth and processing require complex techniques involving extreme conditions such as high temperatures and pressures, as well as strict control over crystal structures, all of which increase production costs. Moreover, these materials often need to be grown on heterogeneous substrates, further complicating the manufacturing process.

According to another aspect, the visible light modulator includes: a modulator substrate; a covering layer, fabricated on the modulator substrate, to cover and support the thin-film optical waveguide; a thin-film optical waveguide, covered by the covering layer; an electro-optic material thin film bonded to the covering layer, supporting the coplanar waveguide electrodes; coplanar waveguide electrodes attached to the thin-film electro-optic material layer, modulating optical signals by applying an electric field; the distance between the thin-film optical waveguide and the bottom surface of the thin-film electro-optic material layer may be less than 100 nm.

This is an optimized solution for the basic configuration, where the covering layer serves to cover the optical waveguide, and the distance between the thin-film optical waveguide and the electro-optic material layer may be less than 100 nm. This distance ensures that the optical mode field in the waveguide can effectively couple into the thin-film electro-optic material layer. The novel design structure used in this disclosure resolves the loss issues inherent in traditional mode conversion, significantly improving optical signal transmission efficiency and system reliability.

Compared with existing technologies, some of the beneficial effects of the present disclosure include: the modulator provided by the present disclosure significantly improves the modulation efficiency and response speed of optical signals; the modulator provided by the present disclosure greatly enhances the bandwidth and modulation efficiency; fand the modulator reduces the loss issues found in traditional mode conversion, significantly improving optical signal transmission efficiency and system reliability.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

To facilitate a better understanding of the solutions presented in this disclosure, detailed descriptions of the technical aspects are provided below in conjunction with the accompanying drawings. It is evident that the embodiments described here are only a subset of all possible implementations and do not represent the entirety of the disclosure. All other embodiments that can be derived by those skilled in the art without requiring creative effort should fall within the scope of protection of this disclosure.

It is important to note that terms such as "first" and "second" used in the description, claims, and drawings of this disclosure serve only to distinguish similar entities and are not intended to denote a specific order or priority. These terms should be interpreted as interchangeable, where appropriate, to implement the described embodiments of this disclosure. Furthermore, terms like "comprise" and "have," along with their variations, are intended to indicate non-exclusive inclusion. For example, processes, methods, systems, products, or devices described with certain steps or components do not preclude the inclusion of unmentioned steps or components inherent to such processes, methods, systems, products, or devices.

Terms such as "bonding," "thin film," and "fabrication" in this disclosure should be interpreted broadly. For instance, "bonding" may refer to eutectic bonding, surface-activated bonding, or intermediate-layer bonding. Similarly, "thin film" can include spin-coated films, deposited films, or thinned films. "Fabrication" may encompass methods such as Plasma-Enhanced Chemical Vapor Deposition (PECVD), Low-Pressure Chemical Vapor Deposition (LPCVD), or magnetron sputtering. The precise meaning of these terms should be understood by those skilled in the art based on the context.

It is also emphasized that the embodiments and features of this disclosure can be combined in any manner, provided there is no conflict. The detailed descriptions of the disclosure are provided below in conjunction with the drawings and examples.

Figure 1:
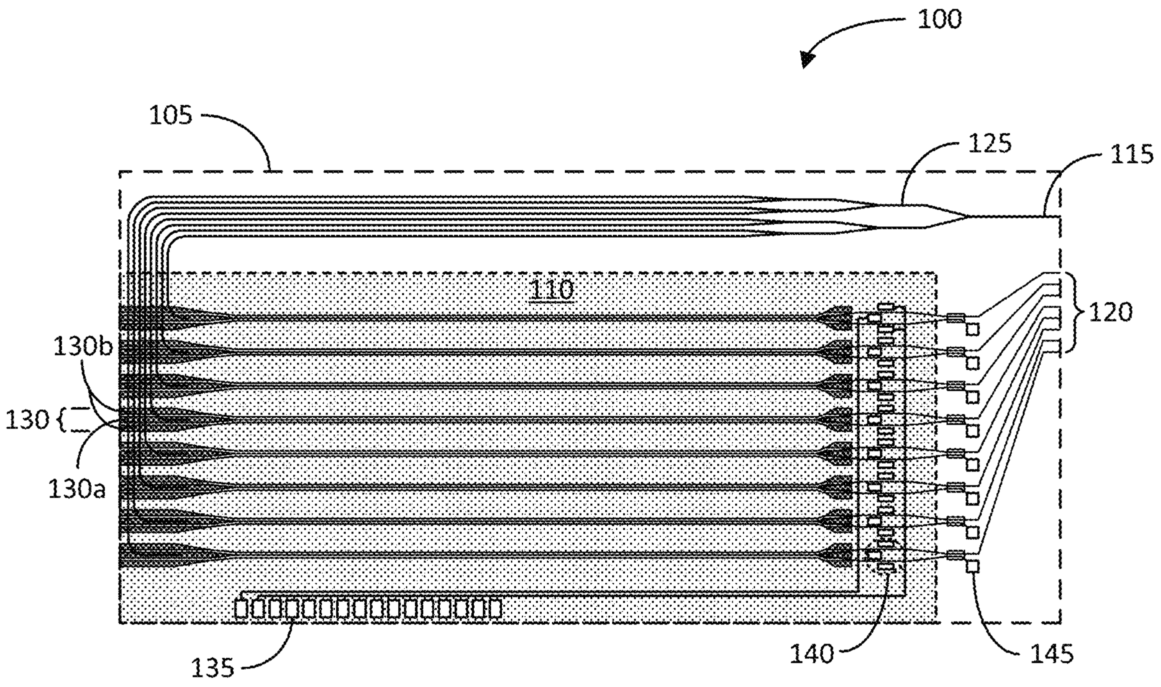
FIG. 1 shows a top view of an example multi-channel visible light modulator including integrated optical splitter and optoelectronic detectors in accordance with an aspect of the disclosure.

FIG. 1 shows a top view of an example visible light modulator 100 which integrates an optical splitter and optoelectronic detectors in accordance with an aspect of the disclosure. The visible light modulator 100 is configured to provide high-speed optical communication and computing. The visible light modulator 100 includes a modulator substrate 105, which provides structural support and serves as an integration platform for photonic and electronic components. The visible light modulator 100 further includes a thin-film waveguide layer 110 disposed on the modulator substrate 105, which equipped with coplanar waveguide electrodes 140 to modulate optical signals via applied electric fields (e.g., effectuated by direct current (DC) bias voltages).

Additionally, the visible light modulator 100 includes an input waveguide 115 configured to guide incoming optical signals. The input waveguide 115 is disposed over the modulator substrate 105. Further, the visible light modulator 100 includes a set of channel output waveguides 120 configured to direct and output modulated optical signals. Additionally, the visible light modulator 100 an optical splitter 125 configured to distribute the incoming optical signals into multiple modulation channels for parallel processing. The visible light modulator 100 includes a set of channel photodetectors configured to monitor modulated optical signals to enable real-time performance evaluation. The visible light modulator 100 includes a set of channel coplanar RF electrodes 130 configured to apply a set of modulation voltages to control the electro-optic response of the thin-film material, respectively. Each of the set of channel coplanar RF electrodes 130 may be implemented in a signal-ground-signal (SGS) or ground-signal-ground (GSG) configuration. Further, the visible light modulator 100 includes a set of bias electrodes 140 configured to receive DC bias voltages to adjust refractive indices in interferometer arms to fine-tune phase modulation, balance outputs, and set the optimal operating point.

The optical splitter 125 in the modulator 100 is an Arrayed Waveguide Grating (AWG) demultiplexer, which is particularly suitable for Coarse Wavelength Division Multiplexing (CWDM) applications. The optical splitter 125 may also be implemented as a Y-branch splitter, or a multimode interference (MMI) splitter. The coplanar waveguide electrodes 130 include a signal electrode 130*a* and ground electrodes 130*b*, connected through an inverted taper coupler. The electrode structure 130 adopts a periodically loaded coplanar slot-waveguide configuration, optimized via slot parameter adjustments to ensure high modulation efficiency and impedance matching. The input and output waveguides utilize a two-stage inverted taper coupler to achieve mode conversion. The tip width of the inverted taper coupler ranges from 100-700 nm, facilitating mode conversion between optical fibers and thin-film waveguides.

The thin-film waveguide layer 110 comprises an electro-optic material, modulating optical signals under the control of RF electrode voltages. The thin-film electro-optic materials include $LiNbO_3$ (lithium niobate), $KH_2PO_4$ (potassium dihydrogen phosphate), KTP (potassium titanyl phosphate), electro-optic polymers, and $BaTiO_3$ (barium titanate). The waveguide material within the thin-film waveguide layer may include silicon nitride, silicon, or polymer. A cladding layer covers the thin-film electro-optic material and coplanar waveguide electrodes, made from silica ($SiO_2$) or polymer, to enhance optical confinement and protect the components. The visible light modulator 100 integrates an optical splitter 125 and a set of channel photodetector 145.

The visible light modulator 100 includes several key components and their arrangement: The modulator substrate 105, which may be made of silicon, provides structural support and serves as the integration platform for various optoelectronic components. The optical splitter 125 distributes the optical signal entering from the input waveguide into multiple modulation channels (e.g., eight (8) channels), enabling parallel processing. A bonded thin-film layer of electro-optic material 110 performs the modulation of the optical signal. Its electro-optic response is controlled by the modulation voltage applied through RF electrodes 130. Bias electrodes 140 are used to adjust the refractive index in the interferometer arms, enabling precise phase modulation and intensity tuning of the output signal. These bias electrodes 140 also balance the interferometer and set the operating bias point using a DC bias voltage received via contacts 135 to ensure optimal performance. Photodetectors 145 monitor the modulated optical signal to enable real-time performance evaluation.

Figure 14:
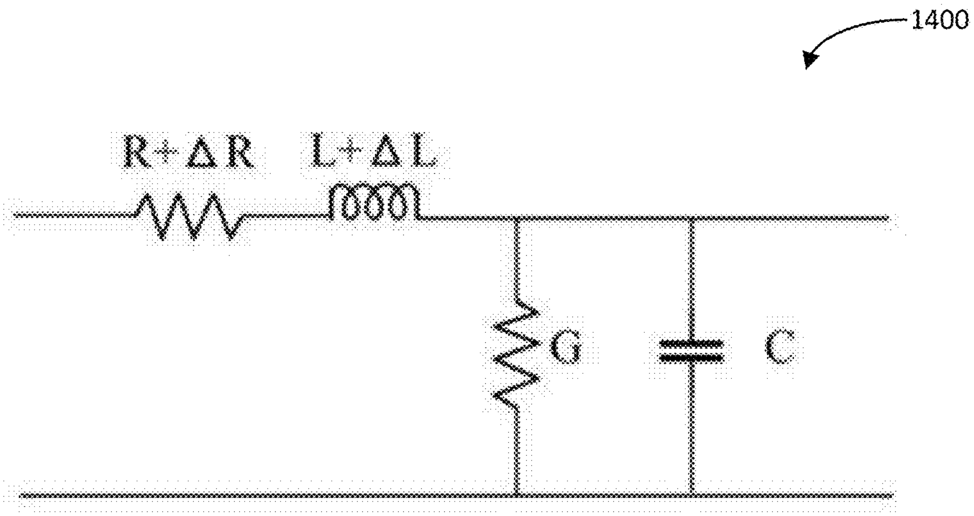
FIG. 14 shows the equivalent circuit model diagram of the example coplanar slot-waveguide design of FIG. 13 in accordance with another aspect of the disclosure.

The output waveguide 120 outputs the modulated optical signal. Both the input and output waveguides 115 and 120 may optionally employ two-stage tapered couplers, as shown in FIG. 14, to optimize optical coupling efficiency and reduce insertion loss. By integrating the optical splitter 125 and photodetectors 145, this design achieves efficient optical signal distribution, precise modulation, and real-time monitoring. It is suitable for high-density optical signal processing systems in optical communications and photonic computing devices. Potential applications include, but are not limited to: photonic switching networks for neuromorphic or quantum computing; devices for microwave-to-optical quantum state conversion; integrated electro-optic frequency comb sources; on-chip second-harmonic generation and squeezed-light generation; and high-speed electro-optic devices or fast-tuning low-noise lasers for optical communications. These applications highlight the versatility of this visible light modulator 100 and underscores its critical role in advancing high-performance optoelectronic systems.

Figure 2:
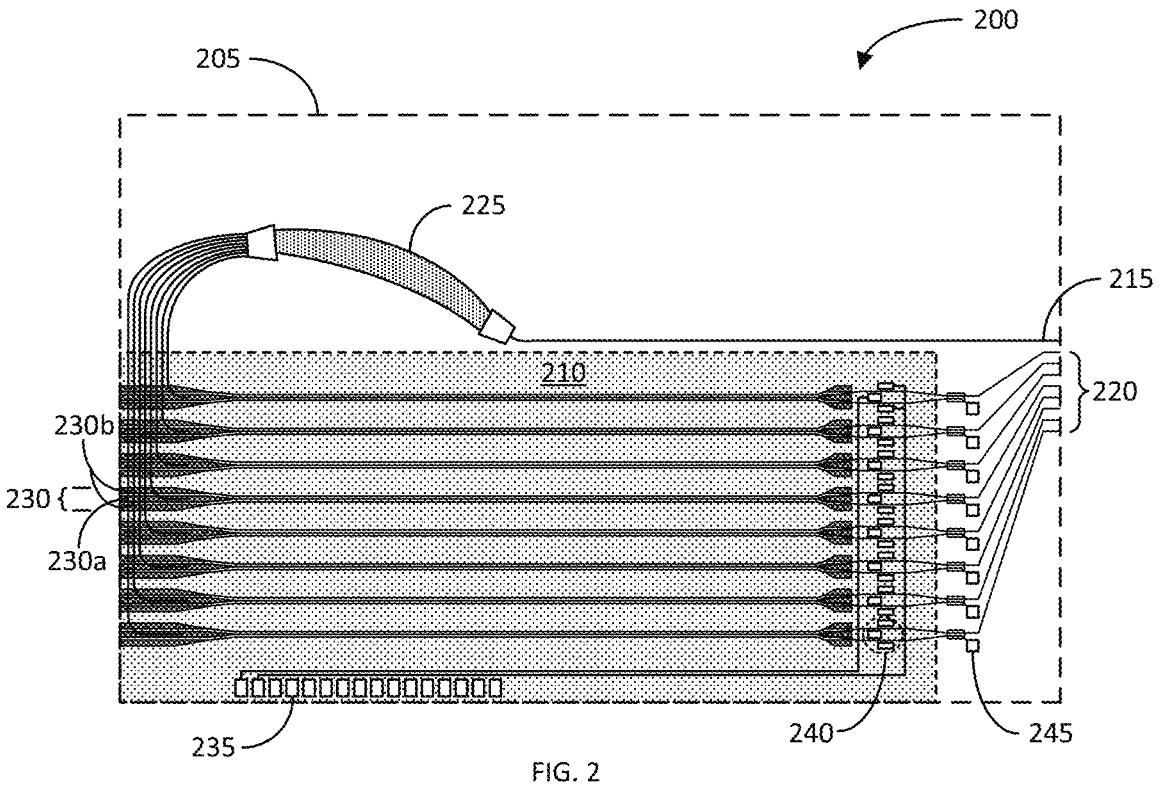
FIG. 2 shows a top view of an example multi-channel visible light modulator including integrated arrayed waveguide grating (AWG) demultiplexer and optoelectronic detectors in accordance with an aspect of the disclosure.

FIG. 2 shows a top view of an example multi-channel visible light modulator 200 which integrates an arrayed waveguide grating (AWG) demultiplexer and optoelectronic detectors in accordance with an aspect of the disclosure. The visible light modulator 200 is similar to visible light modulator 100 including many similar elements as indicated by the same reference numbers with the exception that their most significant digital is a “2” in visible light modulator 200 instead of a “1” in visible light modulator 100. A key difference between the modulators 100 and 200 is that the optical splitter 125 of visible light modulator 100 is replaced by an AWG demultiplexer 225 in visible light modulator 200, making the modulator 200 more suitable for wavelength division multiplexing (CWDM) applications.

In particular, the visible light modulator 200 includes a modulator substrate 205, which may be made of silicon, and provides structural support and serves as the integration platform for various optoelectronic components. The AWG demultiplexer 225 is configured to separate the optical signals from the input waveguide into multiple modulation channels. The electro-optic thin-film layer 210 is configured to modulate the optical signals. Its electro-optic response is controlled by the modulation voltage applied through RF electrodes 230. Bias electrodes 240 are configured to receive DC bias voltages, which may be used to adjust the refractive index in the interferometer arms for precise phase modulation, output signal intensity tuning, and balance adjustment of the interferometer, ensuring optimal performance. Photodetectors 240 are configured to monitor the modulated optical signal for real-time performance evaluation. The output waveguides 220 are configured to direct and output the modulated optical signal. This design, through the integration of the AWG demultiplexer 225 and photodetectors 245, achieves efficient optical signal separation, precise modulation, and real-time monitoring. It is well-suited for high-density optical signal processing systems employing wavelength division multiplexing.

The advantages of this disclosure include hybrid integration of different material platforms for optimized power, performance, and cost. Such optimization ensures high performance while significantly reducing system costs. Additionally, the design offers extensive flexibility, allowing customization for specific application needs. Another notable advantage is the use of thermally stable waveguides that support multi-channel scalability. These thermally stable waveguides maintain consistent performance across varying temperatures, ensuring reliability and scalability for large-scale, high-density optical communication applications.

The waveguide structure of the visible light modulator 100 or 200 described above is shown in FIGS. 3-6.

Figure 3:
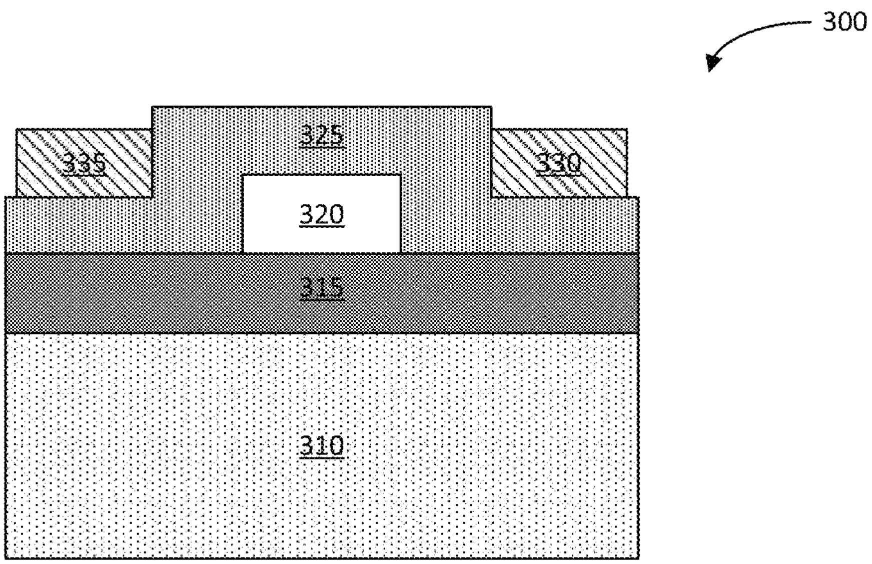
FIG. 3 shows a cross-sectional view of an example thin-film optical waveguide structure suitable for the visible light modulator in accordance with an aspect of the disclosure.

FIG. 3 illustrates a cross-sectional view of an exemplary thin-film waveguide structure 300 in accordance with another aspect of the disclosure. Any of the visible light modulators described herein may include the thin-film waveguide structure 300. The thin-film waveguide structure 300 includes thin-film substrate 310, an electro-optic material thin film 315, a thin-film optical waveguide 320, a coating layer 325, a signal coplanar RF electrode 330, and a ground coplanar RF electrode 335. The electro-optic material thin film 315 is bonded to the thin-film substrate 310 via ion slicing. Materials such as $LiNbO_3$ (Lithium Niobate), $BaTiO_3$ (Barium Titanate), or KTP (Potassium Titanyl Phosphate) can be used for the electro-optic material thin film 315. Alternatively, the electro-optic material thin film 315 can be formed by spin-coating methods using materials like $LiNbO_3$, $BaTiO_3$, or KTP thin-film coatings, or electro-optic polymers.

The thin-film waveguide structure 300 includes a thin-film optical waveguide 320 disposed over the electro-optic material thin film 315. The thin-film optical waveguide 320 may be implemented per a heterogeneous ridge structure, manufactured on the electro-optic thin film 315 using photolithography and etching techniques. These ridge structures effectively guide and confine light within specific regions. As discussed further herein, an optional cladding layer encapsulating the thin-film optical waveguide 320 may be added, typically made of materials with lower refractive indices than the electro-optic material, such as $SiO_2$ or certain polymers. This ensures effective confinement and transmission of light within the ridge waveguide, enhancing overall performance and efficiency.

The coating layer 325 may be disposed over the thin-film optical waveguide 320 and the electro-optic material thin film 315 and/or the optional cladding layer. The coplanar signal RF electrode 330 and the coplanar ground RF electrode 335 may be disposed over the coating layer 325.

Figure 4:
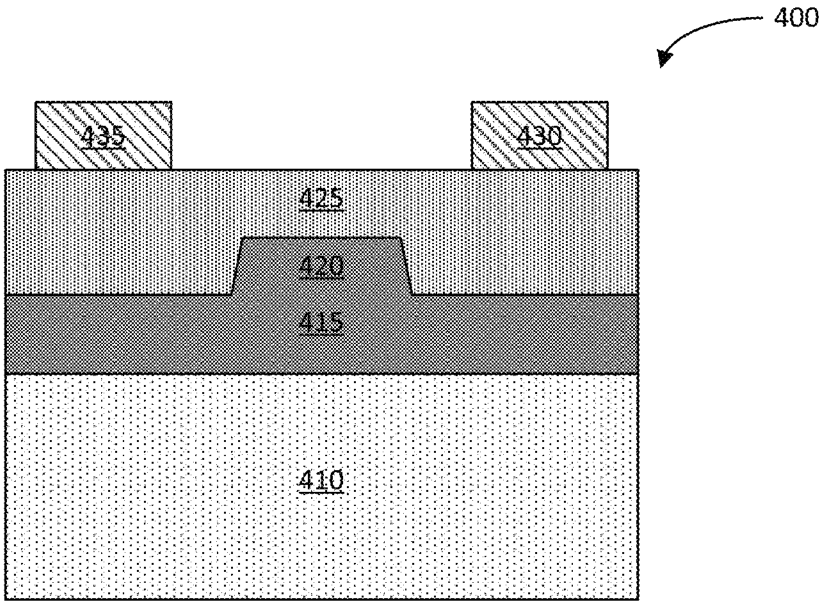
FIG. 4 shows a cross-sectional view of another thin-film optical waveguide structure suitable for the visible light modulator in accordance with another aspect of the disclosure.

FIG. 4 shows a cross-sectional view of another thin-film optical waveguide structure 400 suitable for any of the visible light modulators described herein in accordance with another aspect of the disclosure. It illustrates an alternative design of the exemplary thin-film optical waveguide described in this disclosure. In this structure, the electro-optic material thin film 415 can be an electro-optic crystal material bonded to the thin-film substrate 410 through ion slicing technology, such as LiNbO3 (lithium niobate), BaTiO3 (barium titanate), KTP (potassium titanyl phosphate), etc. Additionally, the electro-optic thin film 415 may also be a thin-film coating prepared by the sol-gel method, formed via spin coating, such as LiNbO3, BaTiO3, KTP, or an electro-optic polymer applied by spin coating. The thin-film optical waveguide structure 400 may also include a coating or cladding layer 425 disposed over the electro-optic thin film 415.

Unlike the thin-film optical waveguide 300, the thin-film optical waveguide 300 does not fabricate ridge waveguides on the electro-optic thin film 415; instead, it forms shallow ridge waveguides 420 directly on the electro-optic material thin film 415. This shallow ridge waveguide 420 design helps further optimize the transmission performance of light waves. Furthermore, the optional cladding layer 425 can be applied to reduce optical loss and optimize the speed matching between the RF and optical signals. The coplanar signal RF electrode 430 and the coplanar ground RF electrode 435 may be disposed over the cladding layer 425.

Figure 5:
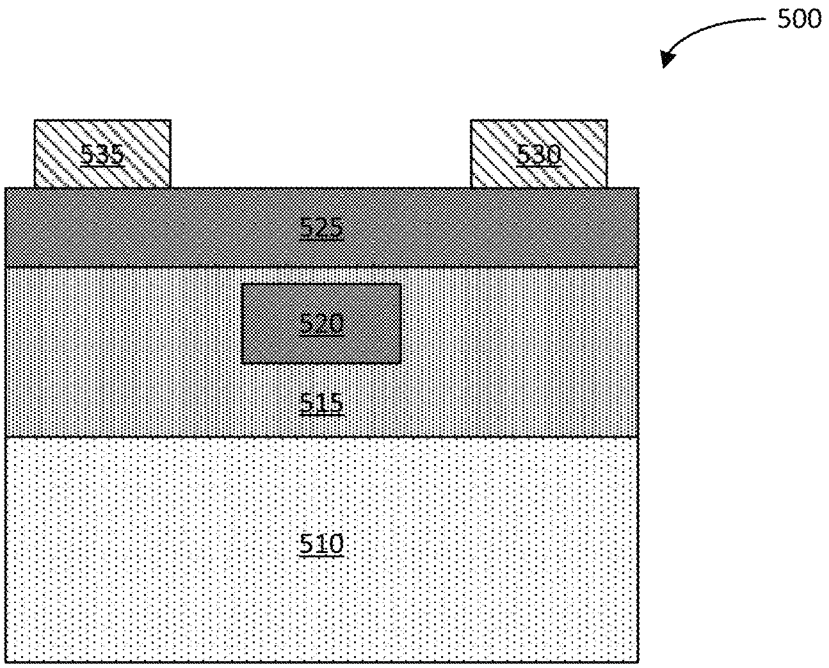
FIG. 5 shows a cross-sectional view of another example thin-film optical waveguide structure suitable for the visible light modulator in accordance with another aspect of the disclosure.

FIG. 5 shows a cross-sectional view of another example thin-film optical waveguide 500 structure suitable for any of the visible light modulators described herein in accordance with another aspect of the disclosure. In this structure, the thin-film optical waveguide structure 500 includes a thin-film substrate 510, a cladding layer 515 disposed over the thin-film substrate 510, and a buried thin-film optical waveguide 520 formed within the cladding layer 515. The optical waveguide 520 being buried means that it is situated below or beneath of an electro-optic material film 525. That is, the thin-film optical waveguide structure 500 is coated within a cladding layer 515 over the thin-film substrate 510, where the refractive index of the cladding layer 515 is slightly lower than that of the thin-film optical waveguide 520. The gap between the thin-film optical waveguide 520 and the electro-optic material thin film 525 is very small, allowing the optical mode field in the thin-film optical waveguide 520 to couple into the electro-optic material thin film 515. This tight coupling design not only ensures efficient transmission of the optical signal but also maximizes the utilization of the nonlinear optical properties of the electro-optic material. The coplanar signal/ground RF electrodes 530/535 may be disposed over the electro-optic material thin film 525.

In the specific structure, the thin-film substrate 510 can be made from different materials to meet the requirements of mechanical strength and thermal expansion coefficient matching. The cladding layer 515 is typically made of a material with a low refractive index, such as silicon dioxide ($SiO_2$) or other suitable polymer materials, to ensure that the optical mode field in the thin-film optical waveguide is effectively confined within the waveguide.

Figure 6:
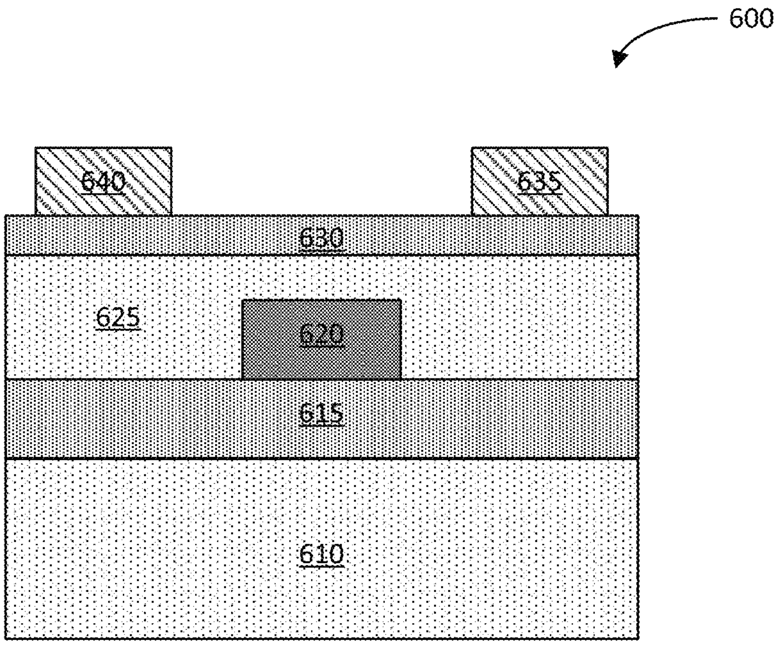
FIG. 6 shows a cross-sectional view of yet another example thin-film optical waveguide structure suitable for the visible light modulator in accordance with another aspect of the disclosure.

FIG. 6 shows a cross-sectional view of another example thin-film waveguide structure 600 suitable for the visible light modulator 100 or 200 in accordance with another aspect of the disclosure. In this structure, the thin-film waveguide substrate 600 is typically made from a material with good mechanical strength and thermal stability, such as silicon (Si) or other suitable materials. A first layer of glass cladding 625, prepared by the sol-gel method, covers the thin-film substrate 610 including the electro-optic material thin film 615. This cladding layer 625 serves as an optical isolator, ensuring that the optical signal in the thin-film optical waveguide 620 is not absorbed or scattered by the substrate material. The thin-film optical waveguide 620 is embedded in an electro-optic polymer layer 625 prepared by spin coating. Through an annealing process, the optical properties of the electro-optic polymer layer can be further improved, enhancing its stability and optical characteristics.

The tight coupling between the thin-film optical waveguide 620 and the electro-optic polymer 625 allows the optical mode field in the waveguide 620 to effectively couple into the electro-optic material 615, thereby improving the transmission efficiency and modulation performance of the optical signal. Another layer of glass cladding 630, made using the sol-gel method, covers the electro-optic polymer layer 625. The coplanar signal/ground RF electrodes 635/640 may be disposed over the glass cladding 630.

Compared to traditional crystal and amorphous material modulators, the intrinsically low dielectric constant of the electro-optic polymer 625 results in a similar refractive index between the microwave and optical signals, which minimizes the speed mismatch between them. This characteristic enables the device to achieve high-speed and wide-band operation. Through this design, the close coupling between the thin-film optical waveguide 620 and the electro-optic polymer 625 ensures efficient coupling of the optical mode field into the electro-optic material 615, thereby improving the transmission efficiency and modulation performance of the optical signal.

Figure 7:
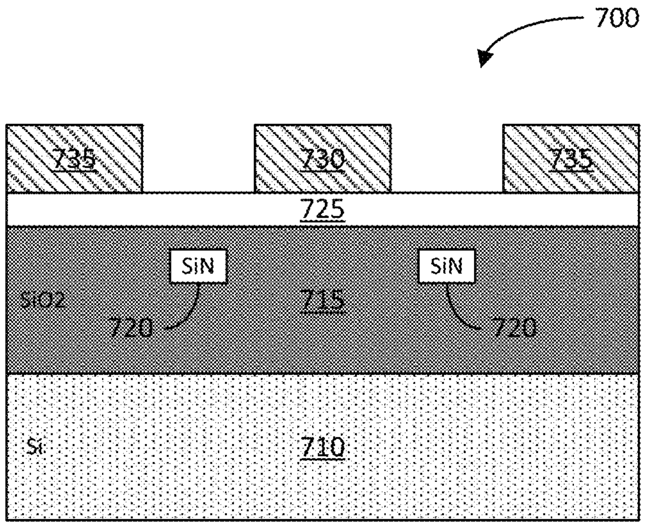
FIG. 7 shows a cross-sectional view of an example thin-film optical waveguide structure in accordance with another aspect of the disclosure.

FIG. 7 shows a cross-sectional view of an example thin-film optical waveguide structure 700 in accordance with another aspect of the disclosure. The thin-film optical waveguide structure 700 includes a modulator (e.g., Silicon (Si)) substrate 710; a cladding layer 715 disposed on top of the modulator substrate 710, used to coat the buried thin-film optical waveguides 720. As illustrated, the buried thin-film optical waveguides 720 is coated within the above cladding layer 715. Electro-optic material thin film 725, bonded onto the cladding layer 715, is used to carry the coplanar waveguide electrodes 730 (signal) and 735 (ground). The optical waveguide 720 being buried means that it is situated below or beneath of an electro-optic material film 725. The coplanar waveguide electrodes 730/735 are attached to the thin-film electro-optic material layer 725, modulating the optical signal by applying an electric field. The distance between the buried thin-film optical waveguide 720 and the lower surface of the electro-optic material thin film 725 may be less than 100 nm.

The thin-film optical waveguide structure 700 may be based on the thin-film optical waveguide structure 500. The electro-optic material thin-film 725 uses a lithium niobate (LiNbO3) thin film as an example. This is a coplanar waveguide electrode structure for a Mach-Zehnder interferometer modulator. The buried SiN optical waveguide 720 is coated within a SiO2 cladding layer 715 on a silicon-based modulator substrate 710 made of silicon (Si).

The gap between the buried thin-film optical waveguide 720 and the thin-film electro-optic material layer 725 of lithium niobate is very small (this gap may be controlled to be less than 100 nm), allowing the optical mode field in the waveguide to couple effectively into the thin-film electro-optic material layer 725. This tight coupling design not only ensures efficient transmission of the optical signal but also maximizes the utilization of the nonlinear optical properties of the electro-optic material.

In addition, thin-film optical waveguide 700 includes the signal electrode 730 and the ground electrode 735. With this electrode structure, efficient modulation of the optical signal can be achieved. The coplanar waveguide electrodes 730/735 are arranged on the two arms of the Mach-Zehnder interferometer (MZI) modulator. By applying a voltage between the electrodes 730 and 735, an electric field is generated, which changes the refractive index of the electro-optic material (such as lithium niobate). This results in a phase change in the two optical waveguide branches. By adjusting the applied voltage, the phase difference of the optical signal can be precisely controlled, thus enabling modulation of the optical signal.

Figure 8:
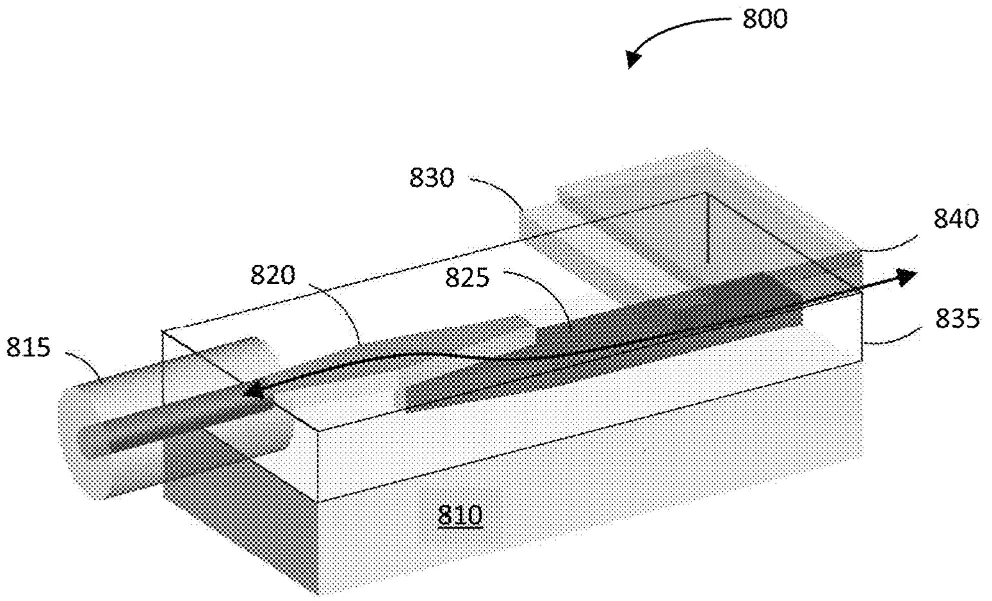
FIG. 8 shows a three-dimensional perspective view of an example visible light modulator in accordance with another aspect of the disclosure.

FIG. 8 shows a three-dimensional perspective view of an example visible light modulator 800 in accordance with another aspect of the disclosure. The visible light modulator 800 includes a thin-film substrate 810, a cladding (SiO2) layer 835 disposed over the thin-film substrate 810, an input optical fiber 815, and a two-stage tapered coupler including an inverse-tapered coupler 820 coupled to a buried tapered coupler 825, both of which are situated within or embedded in the cladding layer 835. The input optical fiber 815 is optically coupled to the inverse-tapered coupler 820. The buried inverse-tapered coupler 825 is coupled to a thin-film optical waveguide, such as buried SiN thin-film optical waveguides 720. The visible light modulator 800 includes a thin-film electro-optic material layer 830. The inverse-tapered coupler 825 being buried means that it is situated below or beneath of an electro-optic material film 830. The visible light modulator 800 includes the coating and electrode layer 840 that includes the signal electrode 730 and the ground electrodes 735.

In efficient fiber-to-chip edge coupling, a key challenge is the mode mismatch between the waveguide on the modulator chip and the optical fiber. For example, the mode field diameter (MFD) associated with the buried thin-film optical waveguide 720 may be only a few hundred nanometers. In contrast, the MFD of the common single-mode fiber 815 in the visible light range is typically around three (3) micrometers (μm) to four (4) μm, resulting in significant mode mismatch loss when coupling light from the fiber.

While a buried taper design coupler 820/825 could adapt the MFD, the tip width of such designs is extremely narrow, usually less than 50 nm, and existing silicon photonic foundries may find it challenging to reliably manufacture such fine structures. To address this issue, the proposed process of using a dual-layer edge coupler with a minimum line width typically in the range of a few hundred nanometers, which can be precisely and mass-produced in a CMOS-compatible manufacturing environment. This dual-layer design not only optimizes the mode conversion efficiency from the fiber to the thin-film optical waveguide but also greatly reduces the loss caused by mode mismatch, improving the overall performance and reliability of the system.

In this design, the optical fiber 815 couples with the inverse-tapered coupler 820, which gradually widens. Then, the light passes through a transition between the inverse-tapered waveguide coupler 820 to the second buried inverse-tapered waveguide coupler 825, allowing the signal to be transmitted via evanescent waves to a straight waveguide whose width matches that of the buried thin-film modulator waveguide 720. The second buried inverse-tapered coupler 825 is directly fabricated on the silicon substrate 810, while the first and second buried inverse-tapered waveguide couplers 820/825 are encapsulated in the cladding layer 835. The thin-film electro-optic material layer 830 and coplanar waveguide electrodes 840 are positioned on the upper surface of the cladding layer 835.

Figure 9:
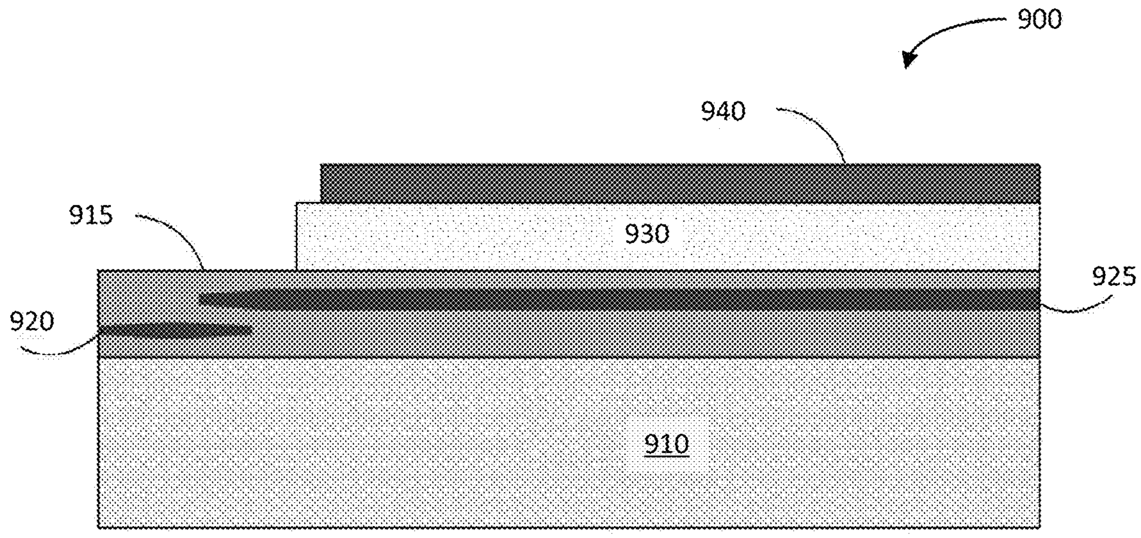
FIG. 9 shows a cross-sectional view of the example visible light modulator of FIG. 8 in accordance with another aspect of the disclosure.

FIG. 9 shows a cross-sectional view of the example visible light modulator 900 in accordance with another aspect of the disclosure. The cross-sectional view of the visible light modulator 900 may correspond to a cross-sectional view of the visible light modulator 800. The visible light modulator 900 includes a substrate (e.g., Si) 910. The visible light modulator 900 includes first and second buried inverse-tapered waveguide couplers 920 and 925 implemented in two stages to efficiently guide the optical signal from an external light source into the modulator's optical waveguide, such as buried waveguide 720. Additionally, the visible light modulator 900 includes a cladding layer 915, which may have a primary function of protecting the internal structure and provide necessary optical isolation, such as preventing light signal leakage. The first and second buried inverse-tapered waveguide couplers 920 and 925 may be encapsulated by the cladding layer 915.

Further, the visible light modulator 900 includes an electro-optic material thin film 930, whose primary medium effectuates the modulation process, can control the phase and intensity of the optical signal passing through it by applying an electric field. The first and second inverse-tapered couplers 920 and 930 being buried means that it is situated below or beneath of an electro-optic material film 930. Additionally, the visible light modulator 900 includes coplanar waveguide electrodes 940 used to apply an electric field, controlling the electro-optic effect of the electro-optic material 930, thereby enabling the modulation of the optical signal. The visible light modulator 900 may also include an optical splitter for distributing the input optical signal to multiple modulation channels. The optical splitter may be an AWG (Arrayed Waveguide Grating) demultiplexer, suitable for wavelength division multiplexing (CWDM) applications.

Additionally, the visible light modulator 900 may also include several photodetectors for monitoring the modulated optical signals. These photodetectors are positioned at an output end of each modulation channel. Furthermore, the visible light modulator 900 includes radio frequency (RF) electrodes for applying the modulation voltage and MZI bias control electrodes for providing the bias voltage. The visible light modulator 900 also includes a cover or coating layer, which is applied over the thin-film electro-optic material layer 930 and coplanar waveguide electrodes 940. The material of the cover or coating layer may be silicon dioxide ($SiO_2$) or a polymer, providing optical isolation and protection.

The visible light modulators described herein may use nonlinear materials with excellent electro-optic effects, such as lithium niobate (LiNbO3), potassium dihydrogen phosphate (KDP), potassium titanyl phosphate (KTP), or barium titanate (BaTiO3), effectively improving the modulation efficiency and response speed of the optical signal. Additionally, As described further herein in more detail, the visible light modulators described herein may adopt a coplanar slot waveguide electrode structure. By using a periodic loading design to slow down the microwave signal propagation speed, it achieves speed matching between the radio frequency (RF) signal and the optical signal, thereby increasing the modulator's bandwidth. By adjusting the parameters of the slots and optimizing RF parameters, high modulation efficiency and impedance matching are ensured. The visible light modulators described herein significantly improves the speed matching between the RF signal and the optical signal, greatly enhancing the modulator's bandwidth and modulation efficiency.

The visible light modulators described herein integrates an optical splitter and monitoring photodetectors, used to distribute the input optical signal to multiple modulation channels and monitor the modulated optical signal in real-time. The optical splitter may use an Arrayed Waveguide Grating (AWG) demultiplexer, which is suitable for wavelength division multiplexing (CWDM) applications, thereby enhancing the flexibility and efficiency of the system.

To address the mode mismatch issue between the optical fiber and the thin-film optical waveguide, the present disclosure proposes a dual-layer inverse taper coupler design. This design can be precisely and mass-produced in a CMOS-compatible manufacturing environment, optimizing the coupling efficiency of light and reducing losses caused by mode mismatch. Specifically, this design solves the loss problem inherent in traditional mode conversion, significantly improving the optical signal transmission efficiency and system reliability.

By using a heterogeneous integration platform, the optical splitter and monitoring photodetectors are integrated, enabling the efficient distribution and real-time monitoring of multi-channel optical signals. This design is suitable for optical communication systems and optical computing devices that require high-density optical signal processing.

Figure 10:
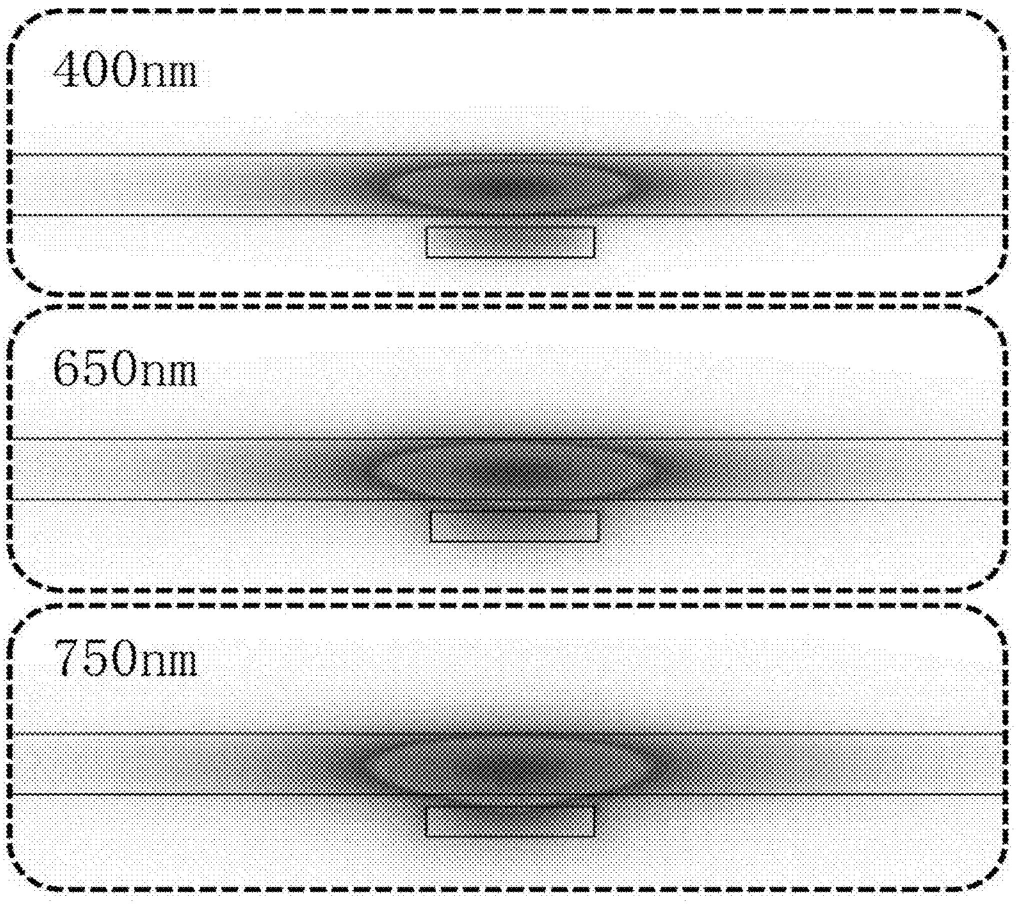
FIG. 10 shows an example optical mode field distribution at multiple different wavelengths of the thin-film optical waveguide of FIG. 7 in accordance with another aspect of the disclosure.

FIG. 10 shows an example optical mode field distribution at multiple different wavelengths (400 nm, 650 nm, and 750 nm) of the thin-film optical waveguide structure 700 in accordance with another aspect of the disclosure. The advantage of this optical waveguide design lies in its wide wavelength adaptability, allowing a single waveguide structure to cover applications across multiple wavelength ranges, simplifying the design and manufacturing process. From these optical mode field distribution images, it is clear that the same waveguide design is applicable to the 400 nm to 750 nm range. Additionally, the tightly coupled structure enhances the optical signal transmission efficiency and modulation performance, maximizing the utilization of lithium niobate's nonlinear optical properties, making it suitable for high-speed and broadband optical communication systems. Although the application shown here is in the visible light spectrum, similar structures can be applied to the optical communication spectrum with simple parameter adjustments.

Figure 11:
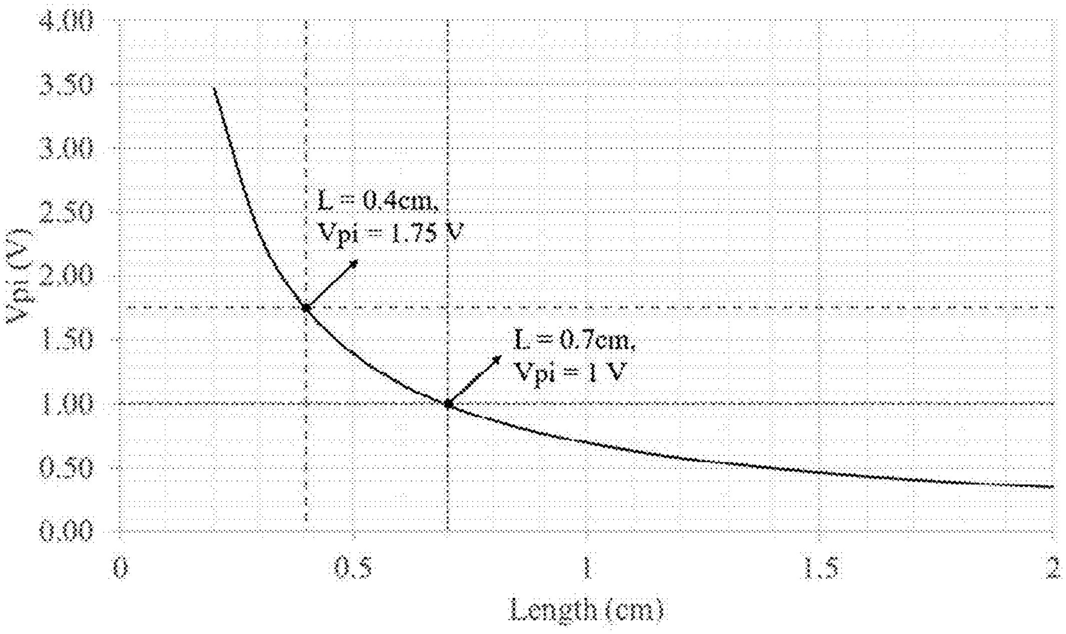
FIG. 11 shows the relationship between the half-wave voltage ($V\pi$) and the modulator length (L) of the example visible light modulator of FIG. 8 in accordance with another aspect of the disclosure.

FIG. 11 shows a graph of an example relationship between the half-wave voltage (Vπ) and the modulator length (L) for this visible light modulator 800 in accordance with another aspect of the disclosure. The vertical axis of the graph presents Vπ (Vpi) in Volt (V). The horizontal axis of the graph represents the length (L) of the visible light modulator 800 in centimeters (cm). The Vπ (Vpi) is defined as the voltage required to induce an optical path difference of half a wavelength. For a device with length L, the calculation formula for Vπ at low frequencies is given by:

$$V\pi = \lambda/[2(\Delta n/V)L]$$

Clearly, for a given electrode and waveguide design, as the modulator length increases, the required half-wave voltage (Vπ) decreases significantly. For example, when the modulator length is 0.4 cm, Vπ is 1.75 volts; whereas when the modulator length increases to 0.7 cm, Vπ drops to 1 volt. However, increasing the modulator length L will also reduce the speed-matching bandwidth. The calculation formula for the speed-matching bandwidth is typically given by:

$$f_{3dB} = c_0/[2n_{rf}L(1 - n_{opt}/n_{rf})]$$

Where, $n_{rf}$ is the effective refractive index of the RF mode, $n_{opt}$ is the effective refractive index of the optical mode.

Figure 12:
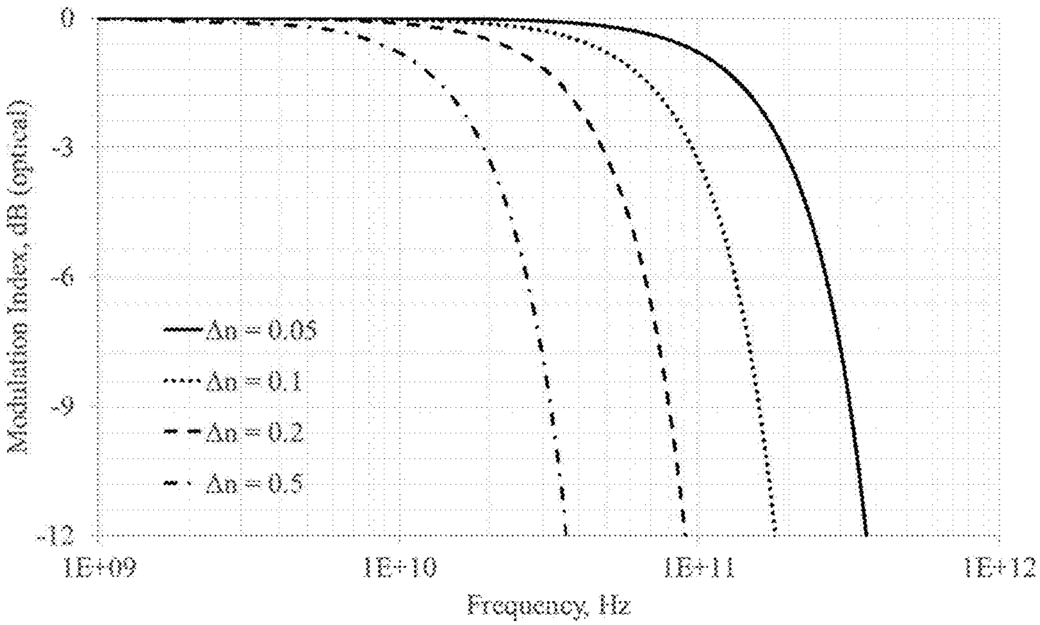
FIG. 12 shows the frequency response of the visible light modulator of FIG. 7 under ideal conditions, with substantially no RF loss and impedance matching between the load and signal source in accordance with another aspect of the disclosure.

FIG. 12 shows the frequency response of the visible light modulator 800 under ideal conditions with no RF losses, and impedance matching between the load and signal source. The frequency response is m(f), where f represents the frequency.

$$m(f) = \left|\frac{\sin(\pi f(n_{rf} - n_{opt})L/c_0)}{\pi f(n_{rf} - n_{opt})L/c_0}\right|$$

Where:

$n_{rf}$ is the effective refractive index of the RF mode, $n_{opt}$ is the effective refractive index of the optical mode, L is the length of the modulator, shown as 10 mm in the figure, $c_0$ is the speed of light.

The frequency response is mainly determined by the speed mismatch between the RF signal and the optical signal. In the case of no speed mismatch, m(f)=1, which is independent of frequency, and the bandwidth is ideally infinite. As shown in the figure, the effective refractive index difference $\Delta n = n_{rf} - n_{opt}$. When the effective refractive index difference Δn is 0.05, the 3 dB bandwidth without RF losses is approximately 110 GHz; when Δn is 0.1, 0.2, and 0.5, the 3 dB bandwidths are approximately 100 GHz, 14 GHz, and 11 GHz, respectively. This shows that the effective refractive index difference has a significant impact on the bandwidth.

In summary, for designing optical modulators with a bandwidth exceeding 100 GHz, the effective refractive index difference Δn between the RF mode and the optical mode should not exceed 0.05 to ensure sufficient bandwidth. This means that at high-frequency operations, the propagation speed matching between RF and optical signals must be precisely controlled to reduce bandwidth limitations caused by speed mismatch. This is crucial for the development of high-speed optical communication systems and high-performance optoelectronic devices, as bandwidth directly impacts signal transmission rate and system performance.

As discussed further herein in more detail, the electrode structure is a periodically loaded coplanar slot waveguide electrode. The coplanar slot waveguide electrode optimizes the RF parameters by adjusting the slot parameters to ensure high modulation efficiency and impedance matching.

Figure 13:
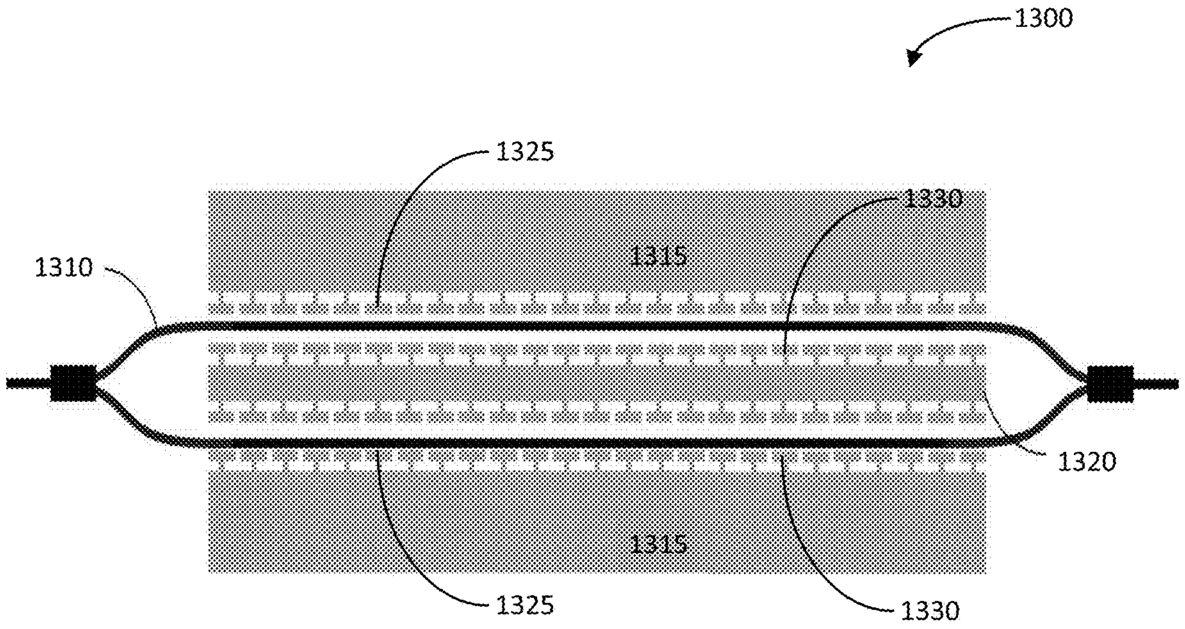
FIG. 13 shows a structural diagram of a visible light modulator based on a coplanar slot-waveguide electrode structure provided by the present disclosure.

FIG. 13 shows a structural diagram of a visible light modulator 1300 based on a coplanar slot-waveguide electrode structure 1315/1320 provided by the present disclosure. Specifically, it is a Mach-Zehnder interferometer (MZI) modulator based on the coplanar slot waveguide electrode structure. As shown in FIG. 13, the optical waveguide 1310 is used to introduce and output optical signals. The core part of the visible light modulator 1300 includes a pair of coplanar waveguide electrodes 1315/1320, where coplanar slot waveguide electrodes are used. The coplanar waveguide electrodes include a signal electrode 1320 and a ground electrode 1315. These electrodes 1315/1320 are arranged on the surface of the electro-optic material 830/930, and an electric field is applied to the material to modulate the optical signal.

Coplanar slot waveguide electrodes are widely studied in III-V compound modulators, primarily for slowing down the microwave signal. This design typically uses a periodically loaded structure (e.g., a set of (e.g., periodic) T-shaped slots 1325 and 1330 protruding from the electrodes 1315 laterally towards the optical waveguides 1310) that is non-uniform along the propagation direction. The periodic T-shaped slots 1325/1330 shown in the figure are an example, though other shapes of slots can be used in practical applications. These slots partially interrupt the current path and increase the impedance and inductance of the electrodes, thereby significantly slowing down the propagation speed of the electromagnetic wave in the waveguide and increasing the effective refractive index of the RF mode.

Compared to traditional coplanar waveguides (CPW), the slot electrode can adjust the RF parameters by controlling the slot parameters, while also ensuring high modulation efficiency and impedance matching. The additional resistance and impedance generated by the slots are primarily determined by the slot dimensions. Furthermore, the periodicity of the slots should be carefully chosen to ensure that the Bragg cutoff frequency is much higher than the operating frequency.

FIG. 14 shows the equivalent circuit model of the coplanar slot waveguide design 1300. This model helps calculate the characteristic impedance of the coplanar slot waveguide electrode structure and the microwave refractive index to match the effective refractive index of the optical mode.

Figure 15:
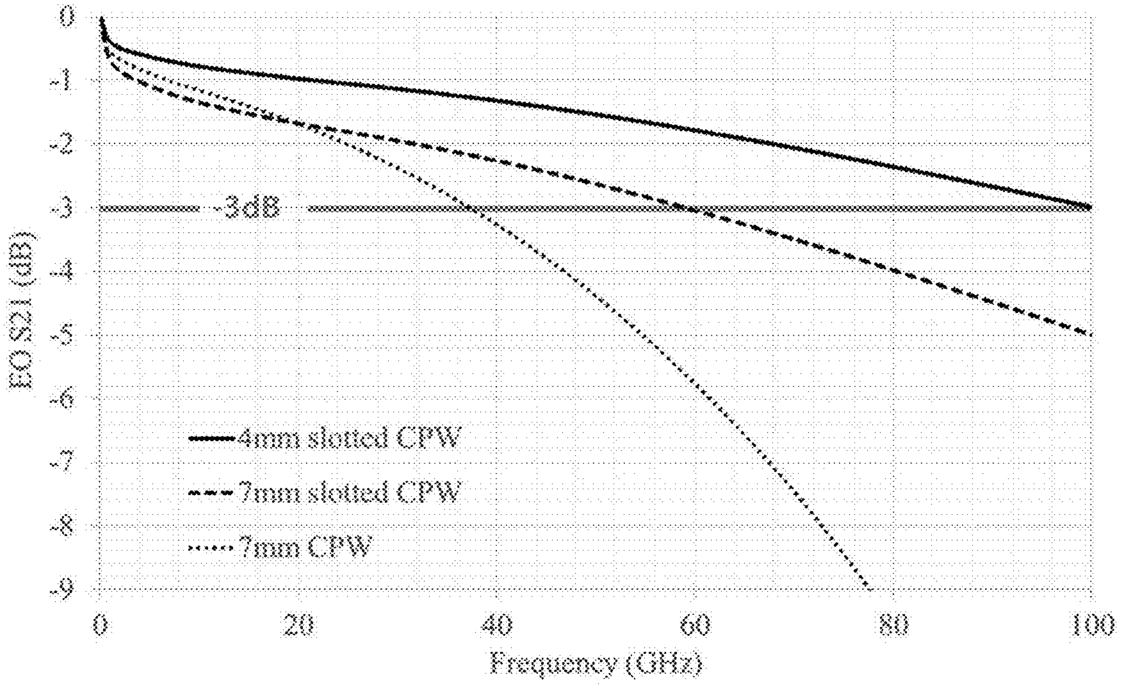
FIG. 15 shows the electro-optic response characteristics of a lithium niobate thin-film optical waveguide modulator with different electrode designs.

FIG. 15 shows the electro-optic response characteristics of a lithium niobate thin-film waveguide modulator with different electrode designs. The figure compares three different lengths and structures of coplanar waveguide electrode designs: a 4 mm coplanar slot waveguide electrode, a 7 mm coplanar slot waveguide electrode, and a 7 mm traditional coplanar waveguide (CPW, without slots).

By analyzing the electro-optic S21 parameters (transmission loss) of these designs at different frequencies, the figure clearly demonstrates the significant impact of electrode structure on modulator performance. As shown, the coplanar slot waveguide electrode exhibits lower transmission loss across a wide frequency range, indicating its excellent electro-optic efficiency, making it especially suitable for high-frequency applications. In contrast, the traditional CPW, due to its lower effective refractive index, results in poor speed matching between RF and optical signals, thereby reducing its electro-optic bandwidth and limiting its performance in high-frequency applications. This figure clearly illustrates that by optimizing the length and structure of the electrodes, the electro-optic response and overall performance of the modulator can be significantly enhanced. This is crucial for designing high-performance and high-speed optical communication systems. The strategy of improving electrode design in this disclosure enables higher modulation efficiency and a broader operating frequency range, providing important technical support for the design of high-speed optical modulators.

It will be apparent to those skilled in the art that the above embodiments are not intended to be exhaustive or to limit the disclosure to the specific precise forms disclosed. Rather, based on the teachings provided, those skilled in the art will recognize that various modifications, combinations, and adaptations can be made.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A visible light modulator, comprising:

a modulator substrate;

a thin-film optical waveguide structure disposed over the modulator substrate, wherein the thin-film optical waveguide structure comprises an electro-optic material and a set of coplanar radio frequency (RF) electrodes electro-optically coupled to a set of thin-film optical waveguides to modulate a set of optical signals using RF signals, thereby generating a set of modulated optical signals, respectively;

a buried waveguide layer disposed below the thin-film optical waveguide structure, wherein the buried waveguide layer comprises a material selected from the group consisting of silicon nitride, silicon, silicon dioxide, or optical polymers;

at least one optical coupler configured to transfer light from the buried waveguide layer to the thin-film optical waveguide structure, wherein the at least one optical coupler comprises at least one vertical or lateral inverse-tapered coupler providing evanescent coupling between the buried waveguide layer and the thin-film optical waveguide; and a set of output optical waveguides configured to receive the modulated optical signals.

2. The visible light modulator of claim 1, wherein the electro-optic material comprises a material selected from the group consisting of lithium niobate, potassium titanyl phosphate, barium titanate, electro-optic polymers, or potassium dihydrogen phosphate.

3. The visible light modulator of claim 1, wherein the buried waveguide layer is configured to support low-loss visible-wavelength optical transmission.

4. The visible light modulator of claim 1, wherein each of the at least one inverse-tapered coupler has a tip width between 100 nanometers and 700 nanometers.

5. The visible light modulator of claim 1, wherein optical coupling between the buried waveguide layer and the thin-film optical waveguide structure is configured to support optical signal modulation in the visible spectrum.

6. The visible light modulator of claim 1, further comprising a set of input optical waveguides formed in the buried waveguide layer and configured to deliver light to the thin film optical waveguide structure via the at least one optical coupler.

7. The visible light modulator of claim 1, further comprising an optical distribution device disposed in the buried waveguide layer, wherein the optical distribution device is configured to split an input optical signal into a set of sub-signals directed to the thin-film optical waveguide structure.

8. The visible light modulator of claim 7, wherein the optical distribution device comprises an arrayed waveguide grating (AWG), multimode interference (MMI) splitter, or Y-branch splitter.

9. The visible light modulator of claim 1, wherein the RF electrodes are configured as coplanar waveguides having a signal-ground-signal (SGS) or ground-signal-ground (GSG) configuration.

10. The visible light modulator of claim 1, further comprising one or more optoelectronic detectors integrated on or over the modulator substrate and configured to receive modulated light for monitoring or signal processing.

11. The visible light modulator of claim 1, wherein the modulator substrate is a silicon or silicon dioxide substrate.

12. A visible light modulator, comprising:

a modulator substrate;

a thin-film optical waveguide structure disposed over the modulator substrate, wherein the thin-film optical waveguide structure comprises an electro-optic material and a set of coplanar radio frequency (RF) electrodes electro-optically coupled to a set of thin-film optical waveguides to modulate a set of optical signals using RF signals, thereby generating a set of modulated optical signals, respectively, wherein the RF electrodes are configured as coplanar waveguides having a signal-ground-signal (SGS) or ground-signal-ground (GSG) configuration, wherein each coplanar RF electrode comprises a periodic loaded slot-line structure or T-shaped slot feature to enhance RF-to-optical coupling efficiency;

a buried waveguide layer disposed below the thin-film optical waveguide structure, wherein the buried waveguide layer comprises a material selected from the group consisting of silicon nitride, silicon, silicon dioxide, or optical polymers;

at least one optical coupler configured to transfer light from the buried waveguide layer to the thin-film optical waveguide structure; and a set of output optical waveguides configured to receive the modulated optical signals.

13. The visible light modulator of claim 12, wherein the slot features are spaced periodically along the length of the RF electrodes.

14. A visible light modulator, comprising:

a modulator substrate;

a thin-film optical waveguide structure disposed over the modulator substrate, wherein the thin-film optical waveguide structure includes a set of coplanar radio frequency (RF) electrodes electro-optically coupled to a set of thin-film optical waveguides to modulate a set of optical signals propagating via the set of thin-film optical waveguides with a set of RF signals propagating via the set of coplanar RF electrodes to generate a set of modulated optical signals, respectively;

an input optical waveguide disposed over the modulator substrate, the input optical waveguide configured to receive an optical signal;

an optical distribution device disposed over the modulator substrate, the optical distribution device configured to split the optical signal into the set of optical signals;

a set of output optical waveguides disposed over the modulator substrate, the set of output optical waveguides configured to direct the set of modulated optical signals to a set of outputs, respectively; and a set of optoelectronic detectors disposed over the modulator substrate, the set of optoelectronic detectors configured to generate signals for evaluating the set of modulated optical signals, respectively.

15. The visible light modulator of claim 14, wherein the optical distribution device comprises an optical splitter.

16. The visible light modulator of claim 14, wherein each of the set of RF electrodes includes a signal electrode and a ground electrode.

17. A visible light modulator, comprising:

a modulator substrate;

a thin-film optical waveguide structure disposed over the modulator substrate, wherein the thin-film optical waveguide structure includes a set of coplanar radio frequency (RF) electrodes electro-optically coupled to a set of thin-film optical waveguides to modulate a set of optical signals propagating via the set of thin-film optical waveguides with a set of RF signals propagating via the set of coplanar RF electrodes to generate a set of modulated optical signals, respectively;

an input optical waveguide disposed over the modulator substrate, the input optical waveguide configured to receive an optical signal;

an optical distribution device disposed over the modulator substrate, the optical distribution device configured to split the optical signal into the set of optical signals, wherein the optical distribution device comprises an arrayed waveguide grating demultiplexer; and a set of output optical waveguides disposed over the modulator substrate, the set of output optical waveguides configured to direct the set of modulated optical signals to a set of outputs, respectively.

* * * * *